United States Patent [19]

Sun et al.

[11] Patent Number: 5,420,239
[45] Date of Patent: May 30, 1995

[54] METHOD FOR INHIBITING POPCORN POLYMER FORMATION BY HEAT

[75] Inventors: Hsiang-ning Sun, Houston, Tex.; Cynthia C. Ingram, Denham Spring; John Jr. J. McManus, Baton Rouge, both of La.

[73] Assignee: Exxon Chemical Patents Inc., Linden, N.J.

[21] Appl. No.: 298,537

[22] Filed: Aug. 30, 1994

Related U.S. Application Data

[63] Continuation of Ser. No. 647,365, Jan. 29, 1991, abandoned.

[51] Int. Cl.$^6$ .............................................. C08F 6/02
[52] U.S. Cl. .................................. 528/481; 528/484; 528/503
[58] Field of Search ...................... 528/481, 484, 503

[56] References Cited

U.S. PATENT DOCUMENTS

| | | | |
|---|---|---|---|
| 2,563,085 | 8/1951 | Utsinger | 585/950 |
| 2,947,795 | 8/1960 | Keown | 260/678 |
| 3,148,225 | 9/1964 | Albert | 585/4 |
| 3,175,012 | 3/1965 | Colbert . | |
| 3,265,751 | 8/1966 | McCoy et al. | 260/666.5 |
| 3,265,752 | 8/1966 | Whiton et al. | 260/665.5 |
| 3,493,603 | 2/1970 | Albert et al. | 260/473 |
| 3,560,577 | 2/1971 | Benjamins | 260/647 |
| 4,404,413 | 9/1983 | Haskell | 585/2 |

FOREIGN PATENT DOCUMENTS 129560 1/1978 Germany .

OTHER PUBLICATIONS

S. Yamamoto et al. "Proliferous Polymerization", *Encyclopedia at Polymr Science and Engineering*, vol. 13, 1988.
International Search Report.
Tokai Electro–Chemical Co., Japanese Kokai No. 63,223,003 (Chemical Abstract).
Liu et al., Determination of Traces of Diethylhydroxylamine Inhibitor in C5 Fraction by Gas Chromatography China Synthetic Rubber Industry, 12 (6)M 408–410 (1989) (Abstract).
Seo et al., Chemical Abstracts, vol. 76 100125g (1972).
Liu, Plugging-Up of Equipment by Self–Polymerization Butadiene Production and its Prevention, China Synthetic Rubber Industry, 11(5) 357–360 (1988).
Liu, Qizhen; *Plugging-up of Equipment by self-polymerized products in Butadiene Production and its Prevention;* Jinan Petrochemical Industry Company, pp. 1–9.

*Primary Examiner*—Joseph L. Schofer
*Assistant Examiner*—Tom Weber
*Attorney, Agent, or Firm*—L. K. Russell

[57] ABSTRACT

Inhibition of popcorn polymer growth by treatment with heat. Heat can be applied to extant popcorn polymer, particularly in the absence of organic material from which the popcorn polymer is formed. A chemical inhibitor of popcorn polymerization can be used in conjunction with the heat treatment.

20 Claims, No Drawings

METHOD FOR INHIBITING POPCORN POLYMER FORMATION BY HEAT

This is a continuation of application Ser. No. 7/647,365, filed Jan. 29, 1991, now abandoned.

CONCURRENTLY FILED APPLICATIONS

Concurrently with this application, also filed were applications entitled INHIBITING POPCORN POLYMER FORMATION WITH SULFUR-CONTAINING COMPOUNDS, filed Jan. 19, 1991, Ser. No. 07/647,356, now U.S. Pat. No. 5,196,619 INHIBITING POPCORN POLYMER FORMATION WITH COMPOUNDS INCORPORATING GROUP IV ELEMENTS, filed Jan. 29, 1991, Ser. No. 07/647,357, now U.S. Pat. No. 5,072,064 INHIBITING POPCORN POLYMER FORMATION WITH ESTERS OF INORGANIC ACIDS, filed Jan. 29, 1991, Ser. No. 07/647,359, now U.S. Pat. No. 5,072,066; and INHIBITING POPCORN POLYMER FORMATION WITH ALKYL HALIDES, filed Jan. 29, 1991, Ser. No. 07/647,358, now U.S. Pat. No. 5,072,065. These applications are all incorporated herein in their entireties, by reference thereto.

BACKGROUND OF THE INVENTION

1. Field of the Invention

The present invention is directed to preventing further growth of popcorn poller seeds or deposits. The desired result is effected by treatment of the popcorn poller with sufficient heat to inhibit, i.e., to prevent, retard, or stop popcorn polymer growth.

One aspect of the invention pertains to such heat treatment of popcorn polymer in the absence, or substantial absence, of organic material from which the popcorn polymer is formed. Another aspect of the invention pertains to such heat treatment of popcorn polymer, wherein the heat treatment is the sole, or essentially the sole, means for effecting the inhibition, retardation, or cessation of popcorn poller growth.

2. Description of Background and Other Information

Popcorn polymers are known to form from all manner of organic material, particularly olefinically unsaturated monomers, including olefins and diolefins; especially susceptible are the conjugated diolefins, e.g., butadiene and isoprene, and vinyl compounds, e.g., styrenes and acrylates. Known as popcorn polymers because they resemble popped corn, these polymers are also referred to in the art as sponge polymers, granular polymers, cauliflower-like polymers, nodular polymers, fluffy polymers, proliferous polymers, and crusty polymers.

Popcorn polymer has been considered to occur from spontaneous monomer polymerization. It can occur in both liquid phase and vapor phase, and at any stage of use or handling of the monomer, e.g., recovery, separation, manufacturing, purification, storage, etc. High concentrations of monomer are particularly advantageous for its formation.

Specifically, it appears that the presence of one or more initiators—e.g., water, oxygen, hydrogen peroxide—results in the formation of popcorn polymer "seeds" in the organic material. The seeds themselves then perpetuate polymerization, without further requiring an initiator and/or a crosslinking agent; they serve as sites for further polymerization.

As the particular mechanism, it is believed that monomer diffuses through the surface of the growing polymer mass, and is added to the polymer at the center thereof. For this reason, such polymerization is referred to as occurring "from the inside out."

Consequently, there is continued incorporation of monomer into the polymer phase, leading to buildup of the popcorn polymer. The result is a hard polymeric foulant, which can cause serious equipment and safety concerns if left unchecked.

A particular problem attendant upon popcorn polymer formation is its extreme resistance to deactivation, once present in a system. Some of the seeds become attached to the processing and handling equipment, and cannot be readily removed by mechanical means; moreover, being insoluble in most common solvents, they are virtually impossible to wash out by use of such solvents.

Even after equipment and storage facilities have been cleaned thoroughly, residual particles of popcorn polymer remain, and promote unwanted polymer growth. Trace particles remaining in the equipment will stay active for long periods without the presence of monomer, and serve to initiate polymerization when once again contacted therewith.

Different inhibitors are known for use against popcorn polymer formation. Examples of these are the following: t-butylcatechol; sodium nitrite, as disclosed in LIU, "Plugging-Up of Equipment by Self-Polymerization Butadiene Production and Its Prevention," *China Synthetic Rubber Industry*, 11(5) 357-360 (1988); carbon disulfide and elemental phosphorous, as disclosed in HASKELL, U.S. Pat. No. 4,404,413, which also refers to hydrogen sulfide, to ethane-, propane-, and hexane-thiol, and to ethyl disulfide as being known in the prior art; N,N-dialkylhydroxylamines, as disclosed in TOKAI ELECTRO-CHEMICAL CO., Japanese Kokai No. 66,223,003, as well as in LIU et al., "Determination of Traces of Diethylhydroxylamine Inhibitor in $C_5$ Fraction by Gas Chromatography," *China Synthetic Rubber Industry*, 12(6), 408-410 (1989), and in ALBERT, U.S. Pat. No. 3,148,225, the latter of these also referring to nitrites, nitroso compounds, $NO_2$, $N_2O_3$, phenolic compounds, sulfur, aromatic amines, and hydroxylamine as being known in the prior art; trialkylamine oxides, as also disclosed in TOKAI ELECTRO-CHEMICAL CO.; N-hydroxymorpholine, used in conjunction with N,N-dialkylhydroxylamines, as disclosed in WHITON al., U.S. Pat. No. 3,265,752, or in conjunction with N-hydroxypiperidine, as disclosed in McCOY et al., U.S. Pat. No. 3,265,751; adducts of phenols and hydroxylamines, as disclosed in ALBERT et al., U.S. Pat. No. 3,493,063; reaction products of nitrous acid and 1,3-dichlorobutene-2 or diisobutylene, as disclosed in BENJAMINS, U.S. Pat. No. 3,560,577, which also refers to nitrogen dioxide, the addition product of 1,3-dichloro-2-butene and nitrogen dioxide, and ion-exchange resin containing nitrite ions, as being known in the prior art; butyraldoxime, as disclosed in KEOWN, U.S. Pat. No. 3,560,577; and nitrogen tetroxide-diisobutylene addition products, as disclosed in COLBERT, U.S. Pat. No. 3,175,012.

Those inhibitors known in the prior art are generally effective in stopping the formation of popcorn polymer seeds, when admixed with popcorn polymer-forming material; however, they are only minimally effective in stopping the growth of seeds already in existence. Further, such inhibitors which are relatively heavy will work in liquid phase, but are of little or no use in vapor phase, because in this state their weight hinders their distribution.

It has been discovered that a simpler and easier way to inhibit popcorn polymer formation is by exposing extant popcorn polymer, e.g., in the form of seeds, deposits, or other sources, to heat. Such heat treatment has unexpectedly been found to "kill" popcorn polymer seeds or sources already formed, i.e., to halt their growth, or at least to retard their growth.

As previously discussed, the chemical inhibitors previously known in the art are not effective for treatment of popcorn polymer already in being, but have significant utility only for preventing the organic material from forming popcorn polymer. Accordingly, in contrast with such inhibitors, the heat treatment of the invention can be used to treat popcorn polymer seeds in the absence of the seed-forming organic material, i.e., by exposing such seeds to heat; in this manner, popcorn polymer formation can be controlled without the necessity for continuous addition of chemical inhibitors to the organic material.

SUMMARY OF THE INVENTION

According to the invention, popcorn polymer is treated with heat to inhibit growth thereof. Specifically, the treatment utilizes a sufficient amount of heat, for a sufficient period of time, to effect the inhibition.

In one embodiment, the process of the invention consists essentially of treating popcorn polymer with heat. In another embodiment, the process of the invention comprises treatment of popcorn polymer with heat, in the absence, or substantial absence, of organic material from which the popcorn polymer is formed. Preferably, the process of the invention consists essentially of treating popcorn polymer with heat, and is also conducted in the absence, or substantial absence, of popcorn polymer-forming organic material.

Different ranges of temperatures and periods of treatment are suitable for the process of the invention. Encompassed within the scope of the invention is treatment of popcorn polymer at a temperature of between 60° C. and 650° C., and for a period of between 15 minutes and 100 hours. More preferably, the popcorn polymer is treated at a temperature of between 120° C. and 430° C., and for a period of between 30 minutes and 48 hours.

The treatment may be conducted at a temperature of 350° C. or greater, for a period of time sufficient to inhibit the growth of the popcorn polymer. In the alternative, the treatment may be conducted at a temperature of 400° C. or greater.

Where the popcorn polymer is formed from 1,3-butadiene, or from isoprene, the process of the invention is preferably conducted at a temperature of at least 260° C., and for a period of at least 24 hours. This treatment is preferably conducted in the absence, or at least substantial absence, of the 1,3-butadiene starting material.

DETAILED DESCRIPTION OF THE INVENTION

This invention relates to the use of heat to inhibit popcorn polymer formation. The term "inhibit" is understood to encompass all degrees of adversely affecting the formulation of popcorn polymer—e.g., both slowing as well as completely halting popcorn polymer growth. In other words, this terms includes adversely affecting the formulation of popcorn polymer in a non-combustive manner.

Encompassed within the scope of the invention is heat treatment including non-combustive treatment—of any popcorn polymer formed form from organic material; the term "organic material" encompasses all organic material wherein, or from which, popcorn polymer forms. Such organic material includes, but is not limited to, olefins and diolefins, particularly the conjugated diolefins, as well as the vinyl compounds, as discussed in HASKELL, U.S. Pat. No. 4,404,413; this patent is incorporated herein in its entirety, by reference thereto.

Specifically, suitable such organic material includes monovinyl compounds such as styrene, acrylic acid and its esters, such as methyl acrylate, ethyl acrylate, and butyl acrylate; methacrylates such as methyl methacrylate, ketones such as methyl vinyl ketone, and nitriles such as acrylonitrile. Appropriate divinyl compounds include 1,3butadiene, isoprene, dimethyl-2,3-buta-1,3-diene, chloroprene, and bromoprene.

Further as to the organic material, two or more monomers such as any combination of those discussed above, can be inhibited from forming popcorn polymer by treating the popcorn polymer formed from any such combination according to the invention.

While retaining its ordinary meaning in the art, i.e., as the starting unit for polymerization, the term "monomer", as used herein, is further understood to encompass all organic material wherein is formed the popcorn polymer susceptible to heat treatment in accordance with the invention. The process of the invention encompasses exposure of popcorn polymer to sufficient heat, in the presence, absence, or substantial absence of monomer, in any manner which will inhibit, prevent, retard, or stop the growth of such popcorn polymer, or the formation of popcorn polymer.

A particular advantage of the process of the instant invention is that, as indicated, it may be conducted whether or not the monomer from which popcorn polymer is formed is present. In a preferred embodiment of the invention, heat treatment of the popcorn polymer is effected in absence, or substantial absence, of any other means for inhibiting popcorn polymer growth, such as chemical inhibitors.

In accordance with the invention, popcorn polymers are inhibited from forming in an organic polymer starting material by exposing popcorn polymer to heat. The degree of heat applied should be sufficient to inhibit popcorn polymer growth-specifically, sufficient to inhibit the further growth of popcorn polymer exposed to such heat.

Temperatures of about 60° C. to about 650° C. are effective in inhibiting popcorn polymer formation. Preferred temperatures range from about 120° C. to about 430° C.; most preferred are temperatures of 260° C. and above.

The heat should be applied to the popcorn polymer for a period sufficient to inhibit popcorn polymer growth; specifically, sufficient to inhibit the further growth of popcorn polymer so treated.

The time for which the popcorn polymer may be heated at the indicated temperatures may vary widely; times ranging from 1 minute to several weeks may be acceptable. Periods of 15 minutes to 100 hours are preferred, with a range of 30 minutes to 48 hours being more preferred.

The heat required to raise the temperature to the required level can be generated by any means which are considered acceptable to one of ordinary skill in the art. This is conveniently accomplished by simply heating the popcorn polymer with an external heat source, or by passing a heated gas through the system containing popcorn polymer to be deactivated.

The methods are not limited to any particular gaseous atmosphere. The atmosphere in which the method is practiced can be air, nitrogen, oxygen-containing gas, helium, argon, steam, and any other gaseous atmospheres standardly used in dealing with organic polymer starting materials, and mixtures thereof.

Similarly, extensive variations are appropriate for the pressure under which the popcorn polymer is treated. For example, the pressure exerted can range from high vacuum (>0.0001 atm.) to superatmospheric pressure (≦1000 atm.). Essentially, any pressure is suitable which can be tolerated by the equipment with which, or wherein, the process of the invention is conducted.

In a particularly preferred embodiment, the monomer to be treated is heated to a temperature of approximately 260° C., or greater, for a period of approximately 24 hours or longer. Such treatment essentially deactivates the popcorn polymer, and produces long lasting inhibition of popcorn polymer formation when the treated popcorn polymer is exposed to polymerizable monomer. Most preferably, no chemical inhibitor is employed in this embodiment of the process of the invention.

Preferably, heat treatment of popcorn polymer, in accordance with the process of the invention, is conducted in the absence of the organic material from which the popcorn polymer is formed; also as a preferred embodiment, such treatment is conducted without the presence of any other means for inhibiting popcorn polymer formation—e.g., chemical inhibitors of popcorn polymerization, as previously discussed. However, the presence of such organic material, or such other means of inhibition, or both, in addition to heat treatment, is within the scope of this invention.

Where the process of the invention incorporates use of chemical inhibitors as well as exposure of popcorn polymer to heat, any such chemical inhibitors having utility for inhibiting popcorn polymer formation, when used in this manner, are suitable; these may be employed in the minimum amount required for inhibiting popcorn polymer growth, as may be ascertained by one skilled in the art. Included are all such chemical inhibitors as disclosed in the co-pending applications discussed at the beginning of this application, and all such chemical inhibitors disclosed in the patents and other publications cited herein, all of these patents and other publications being incorporated herein in their entireties, by reference thereto.

Generally, such parameters as temperature, time, and pressure will vary in accordance with a variety of factors. These may include, but are not limited to, the amount of popcorn polymer present, its growth rate in the presence of monomer, whether such monomer is present or absent during treatment in accordance with the process of the invention, the effectiveness of any additional chemical inhibitor (if any is present), etc. These values are readily ascertainable to one of ordinary skill in the art.

The process of the invention is suitable for treating all systems and other equipment for the manufacture, use, storage, or any other type of handling of popcorn polymer-forming organic material, for the purpose of inhibiting growth of popcorn polymer seeds or other deposits residing therein. For instance, appropriate systems include those for separating desired monomer from a mixed hydrocarbon stream, and those for conducting chemical reactions utilizing the monomer; monomer storage equipment, e.g., tanks, may also be treated in accordance with the process of the invention.

In order to illustrate more fully the nature of the present invention and the manner of practicing the same, but not by way of limitation, the following experimental procedure is presented.

EXPERIMENTAL PROCEDURE

This experimental procedure involved initially treating popcorn polymer seeds, derived from 1,3-butadiene, in accordance with the process of the invention, then leaving the seeds in the presence of butadiene. As a control, this procedure also included a 1,3-butadiene seed/monomer system without such prior treatment.

Specifically, in each test according to this procedure except the control, the seed was placed in an oven in an atmosphere of ambient air. Therein, the seed was subjected to a specified temperature, at a specific pressure, for a specified period of time.

The seeds thusly treated, and the control seed, were suspended in glass polymerization vessels. All air was removed from these vessels, either by evacuation, or by flushing with nitrogen, and 1,3-butadiene was condensed into the vessel at −78° C. In this manner, gas phase polymerization was utilized for all the tests, including the control—i.e., being suspended in their respective vessels, the seeds were maintained out of contact with 1,3-butadiene liquid.

In each test, the system thus established was maintained at 60° C., as a static system, and at autogenic pressure. Popcorn polymer growth rates were measured according to the growth rate of the control.

Specifically, the amount of growth obtained from the control was arbitrarily designated as 1.0. Growth of the other seeds was measured according to this standard.

The results of this procedure are set forth in the Table.

TABLE

| Heat Treatment Temperature (C.°) | Heat Treatment Pressure (mmHg.) | Heat Treatment Period (hours) | Monomer Treatment Period (days) | Popcorn Polymer Growth Rate |
|---|---|---|---|---|
| Control (no heat treatment) | — | — | 14 | 1.0 |
| 25 | 746 | 48 | 14 | 1.2 |
| 25 | 746 | 48 | 14 | 0.9 |
| 90 | 760 | 24 | 14 | 0.25 |
| 90 | 760 | 24 | 14 | 0.22 |
| 150 | 760 | 24 | 14 | 0.10 |
| 150 | 760 | 24 | 14 | 0.15 |
| 260 | 760 | 24 | 65 | 0.0 |

TABLE-continued

| Heat Treatment Temperature (C.°) | Heat Treatment Pressure (mmHg.) | Heat Treatment Period (hours) | Monomer Treatment Period (days) | Popcorn Polymer Growth Rate |
|---|---|---|---|---|
| 260 | 760 | 24 | 65 | 0.0 |

For the two seeds heated only to 25° C., there was little difference between their growth rates and that of the control (untreated) seed. In contrast, significant growth rate reductions were observed for the seeds treated at higher temperatures.

The growth rates of the two seeds subjected to 90° C. were 0.25 and 0.22, in comparison with the arbitrarily designated standard rate of 1.0 for the control. These results signify a 75% reduction in popcorn polymer growth rate for the two seeds so treated.

A yet greater reduction in growth rate occurred for the seeds subjected to 150° C. By the same comparison, the growth rates for these two examples were 0.1 and 0.15, equating to approximately a 90% to 95% reduction.

Heating at yet higher temperatures resulted in further improvement; no growth occurred for the two seeds treated at 260° C. This complete inhibition was observed even after 65 days, more than four times as long as the exposure of the other seeds in the procedure to butadiene.

Accordingly, the higher the temperature to which the seeds were exposed, the lower their growth rates in the presence of monomer. Where temperatures were sufficiently high, popcorn polymer growth was completely halted.

Finally, although the invention has, as been noted above, been described with reference to particular means, materials and embodiments, it should be noted that the invention is not limited to the particulars disclosed, and extends to all equivalents within the scope of the claims. The above description and examples are merely illustrative; numerous changes and variations may be made without departing from the spirit and scope of the invention.

What is claimed is:

1. A method for inhibiting the growth of popcorn polymer, consisting essentially of non-combustive treatment of said popcorn polymer with heat.

2. The method of claim 1, wherein said treatment is conducted in the substantial absence of organic material from which said popcorn polymer is formed.

3. The method of claim 1, wherein said treatment is conducted at a temperature of between about 60° C. and about 650° C., and for a period of between about 15 minutes and about 100 hours.

4. The method of claim 3, wherein said treatment is conducted at a temperature of between about 120° C. and about 430° C., and for a period of between about 30 minutes and about 48 hours.

5. The method of claim 1, wherein said treatment is conducted at a temperature of at least about 350° C., for a period of time sufficient to inhibit the growth of said popcorn polymer.

6. The method of claim 5, wherein said treatment is conducted at a temperature of at least about 400° C., for a period of time sufficient to inhibit the growth of said popcorn polymer.

7. The method of claim 1, wherein said popcorn polymer is formed from 1,3-butadiene, and wherein said treatment is conducted at a temperature of at least about 260° C., and for a period of at least about 24 hours.

8. The method of claim 7, wherein said treatment is conducted in the substantial absence of 1,3-butadiene.

9. The method of claim 1, wherein said popcorn polymer is formed from isoprene, and wherein said treatment is conducted at a temperature of at least about 260° C., and for a period of at least about 24 hours.

10. The method of claim 9, wherein said treatment is conducted in the substantial absence of isoprene.

11. A method for inhibiting the growth of popcorn polymer, comprising treatment of said popcorn polymer with heat and with at least one chemical inhibitor of popcorn polymerization, in the substantial absence of organic material from which said popcorn polymer is formed.

12. The method of claim 11, wherein said treatment is conducted at a temperature of between about 60° C. and 650° C., and for a period of between about 15 minutes and about 100 hours.

13. The method of claim 12, wherein said treatment is conducted at a temperature of between about 120° C. and about 430° C., and for a period of between about 30 minutes and about 48 hours.

14. The method of claim 11, whereof said treatment is conducted at a temperature of at least about 350° C., for a period of time sufficient to inhibit the growth of said popcorn polymer.

15. The method of claim 14, wherein said treatment is conducted at a temperature of at least about 400° C., for a period of time sufficient to inhibit the growth of said popcorn polymer.

16. The method of claim 11, wherein said popcorn polymer is formed from 1,3-butadiene, and wherein said treatment is conducted at a temperature of at least about 260° C., and for a period of at least about 24 hours.

17. The method of claim 12, wherein said popcorn polymer is formed from isoprene, and wherein said treatment is conducted at a temperature of at least about 260° C., and for a period of at least about 24 hours.

18. The method of claim 11, wherein said treatment of said popcorn polymer is non-combustive.

19. A method for inhibiting the growth of popcorn polymer, comprising non-combustive treatment of said popcorn polymer with heat, at a temperature of between about 60° C. and 260° C., for a period of time sufficient to inhibit the growth of said popcorn polymer.

20. A method for inhibiting the growth of popcorn polymer, comprising non-combustive treatment of said popcorn polymer with heat, at a temperature of between about 60° C. and 150° C., for a period of time sufficient to inhibit the growth of said popcorn polymer.

* * * * *